United States Patent
Rigaudeau et al.

(10) Patent No.: US 9,571,234 B2
(45) Date of Patent: Feb. 14, 2017

(54) RETRANSMISSION OF DATA LOST BETWEEN A SENDER AND A RECEIVER

(75) Inventors: Serge Rigaudeau, Pleumeur Bodou (FR); Jerome Crestel, Lannion (FR); Gerard Babonneau, Chatel-Guyon (FR)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 14/128,917

(22) PCT Filed: Jun. 19, 2012

(86) PCT No.: PCT/FR2012/051381
§ 371 (c)(1),
(2), (4) Date: Dec. 23, 2013

(87) PCT Pub. No.: WO2012/175862
PCT Pub. Date: Dec. 27, 2012

(65) Prior Publication Data
US 2014/0129893 A1    May 8, 2014

(30) Foreign Application Priority Data
Jun. 24, 2011    (FR) ..................... 11 55613

(51) Int. Cl.
*H04L 1/18* (2006.01)
*H04L 29/06* (2006.01)
*H04N 21/647* (2011.01)

(52) U.S. Cl.
CPC ........... *H04L 1/1809* (2013.01); *H04L 1/1838* (2013.01); *H04L 1/1864* (2013.01); *H04L 1/1887* (2013.01);
(Continued)

(58) Field of Classification Search
CPC .... H04L 1/1887; H04L 1/1809; H04L 1/1877;
H04L 1/1642; H04L 1/1812; H04L 1/1854; H04L 1/18; H04L 1/1874; H04L 1/1819; H04L 1/188; H04L 1/1607; H04L 2001/0093; H04L 61/35; H04L 65/4076; H04L 65/608; H04L 65/80; H04L 69/326
(Continued)

(56) References Cited

U.S. PATENT DOCUMENTS 5,768,527 A * 6/1998 Zhu et al. .................... 709/231
7,869,463 B2 * 1/2011 Shiizaki et al. .............. 370/498
(Continued)

FOREIGN PATENT DOCUMENTS

EP    1211838 A1    6/2002
EP    1341336 A1    9/2003
(Continued)

OTHER PUBLICATIONS

International Preliminary Report on Patentability and English translation of the Written Opinion dated Dec. 24, 2013 for corresponding International Application No. PCT/FR2012/051381, filed on Jun. 19, 2012.
(Continued)

*Primary Examiner* — James C Kerveros
(74) *Attorney, Agent, or Firm* — David D. Brush; Westman, Champlin & Koehler, P.A.

(57) ABSTRACT

A method is provided for receiving a realtime data stream transmitted at a given speed in the form of packets between a transmitter and a receiver in a telecommunication network. The receiver has a buffer memory for storing the received packets. The method includes the following steps after detection of a loss of packets: requesting retransmission of the lost packets at a speed that is higher than the given speed; receiving retransmitted packets and realtime packets, the retransmitted packets having been transmitted with priority
(Continued)

in relation to the realtime packets; and storing the retransmitted packets in the buffer memory.

11 Claims, 3 Drawing Sheets

(52) U.S. Cl.
CPC ........... H04L 1/1893 (2013.01); H04L 65/608 (2013.01); H04N 21/64776 (2013.01); *H04L 1/18* (2013.01); *H04L 69/16* (2013.01)

(58) Field of Classification Search
USPC .................................................. 714/748, 749
See application file for complete search history.

(56) References Cited

U.S. PATENT DOCUMENTS

| 8,031,701 | B2* | 10/2011 | Oran ............................ 370/356 |
| 8,276,026 | B2* | 9/2012 | Jitsukawa et al. ............ 714/708 |
| 8,775,890 | B2* | 7/2014 | Yap et al. ...................... 714/749 |
| 2002/0021700 | A1* | 2/2002 | Hata ..................... H04L 1/1628 370/395.42 |
| 2003/0097629 | A1* | 5/2003 | Moon et al. .................. 714/751 |
| 2005/0094667 | A1* | 5/2005 | Dahlman et al. ............. 370/473 |
| 2006/0104279 | A1* | 5/2006 | Fellman .............. H04L 12/2854 370/392 |
| 2006/0268871 | A1* | 11/2006 | Van Zijst ...................... 370/390 |
| 2008/0031177 | A1* | 2/2008 | Lee et al. ...................... 370/312 |
| 2009/0034488 | A1* | 2/2009 | Takagi ........................... 370/335 |
| 2009/0060028 | A1 | 3/2009 | Liu et al. |
| 2010/0122135 | A1 | 5/2010 | Lida et al. |
| 2010/0322136 | A1* | 12/2010 | Kanazawa et al. ........... 370/312 |
| 2011/0078530 | A1* | 3/2011 | Shiizaki et al. .............. 714/749 |

FOREIGN PATENT DOCUMENTS

| EP | 1524791 | A2 | 4/2005 |
| EP | 1788742 | A1 | 5/2007 |
| EP | 1168703 | A2 | 1/2012 |
| JP | 2003046593 | A | 2/2003 |

OTHER PUBLICATIONS

International Search Report and Written Opinion dated Oct. 22, 2013 for corresponding International Application No. PCT/FR2012/051381, filed Jun. 19, 2012.
French Search Report and Written Opinion dated Dec. 13, 2011 for corresponding French Application No. 1155613, filed Jun. 24, 2011.

* cited by examiner

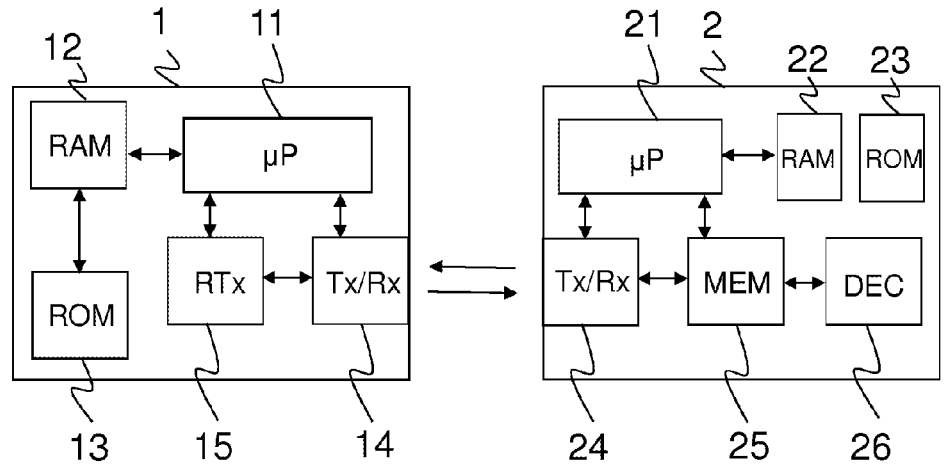
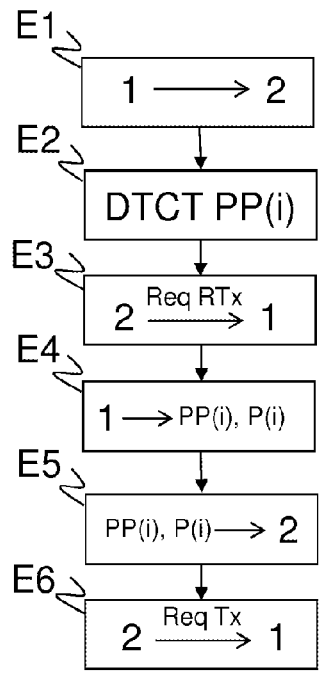
Fig. 3

RETRANSMISSION OF DATA LOST BETWEEN A SENDER AND A RECEIVER

CROSS-REFERENCE TO RELATED APPLICATIONS

This Application is a Section 371 National Stage Application of International Application No. PCT/FR2012/051381, filed Jun. 19, 2012, which is incorporated by reference in its entirety and published as WO 2012/175862 on Dec. 27, 2012, not in English.

FIELD OF THE DISCLOSURE

The field of the invention is that of the transmission of data streams in real time, notably for a delinearized video service called VoD (Video on Demand).

BACKGROUND OF THE DISCLOSURE

Such a service usually involves the use of an IT communication protocol called real-time transport protocol (RTP). With this protocol, the data are transmitted in the form of packets and a mechanism for retransmitting lost data packets is set up to ensure a sufficient level of quality at reception.

At present, an additional passband is used solely in cases of loss, in order to retransmit the lost packets. This dedicated passband is generally small in relation to the passband allocated to the VoD service. The application JP 2003 046593 illustrates an example of use of such a method for retransmitting lost packets, said example being shown in FIG. 1.

In this FIG. 1, packets P(i) are transmitted, at a given speed D1, in a data stream in real time. When some packets PP(i) in this stream are lost, they are later retransmitted with other packets in real time, using an overhead at discrete times in order to attain an increased overall transmission speed D2.

Thus, during the time interval [t1;t2] during which the lost packets PP(i) are retransmitted, these retransmitted packets PP(i) are transmitted at the same time as other packets in real time P'(i), without the data stream in real time being modified by the presence of these retransmission packets. At reception, a buffer memory allows the retransmitted data to be stored. The size of the buffer memory and the value of the additional passband determine the maximum size of the losses that it is possible to correct. In particular, the smaller the value of the additional passband (i.e. the difference between D2 and D1 in FIG. 1), the more time will be necessary in order to retransmit the lost packets.

By way of example, with an additional passband of 20% and losses of 80 ms, a buffer memory of 640 ms is required in order to correct the losses, if the time between the retransmission request and the reception of the first retransmitted packet is 240 ms, this being able to be reproduced every 720 ms.

Thus, it can be seen that the losses that it is possible to correct are relatively short and that they must not be too frequent. This correction mechanism is therefore perfectible.

SUMMARY

The aim of the present invention is to overcome the drawbacks of the prior art by providing a method for transmitting a realtime data stream transmitted at a given speed in the form of packets between a transmitter and a receiver in a telecommunication network, this method having the following steps:
  reception of a request for retransmission of lost packets; and
  transmission of retransmitted packets and realtime packets, the retransmitted packets being transmitted with priority in relation to the realtime packets.

According to one particular embodiment, the retransmitted packets that are transmitted with priority in relation to the realtime packets are transmitted during a time interval during which the real time packets are transmitted at a transmission speed that is lower than the given speed, which allows the retransmission of the lost packets, and therefore the correction of the loss of these packets, to be speeded up.

According to one particularly advantageous feature of this particular embodiment, the retransmitted packets are transmitted at a retransmission speed that is equal to the difference between a speed that is higher than the given speed and the transmission speed of the realtime packets during said time interval, which allows the packets to be transmitted at an overhead allowing correction of the packet losses while optimizing the use of the buffer memory. Thus, for a given size of buffer memory, it is possible to correct larger losses than with the prior art. Alternatively, if a loss length of time to be corrected is set, it is possible to use a buffer memory of smaller size in relation to the prior art.

In another particular embodiment, the retransmitted packets that are transmitted with priority in relation to the realtime packets are transmitted during a time interval during which no realtime packet is transmitted. According to one advantageous feature of this other particular embodiment, the retransmitted packets are transmitted at a retransmission speed that is higher than the given speed.

According to one particular embodiment, the realtime packets in the realtime data stream and the retransmitted packets are transmitted using the RTP protocol. The use of such a loss correction mechanism is particularly advantageous when the RTP protocol is used, because it allows the provision of a certain timing flexibility for this protocol as regards correction of losses.

The invention also relates to a method for receiving a realtime data stream transmitted at a given speed in the form of packets between a transmitter and a receiver in a telecommunication network, the receiver having a buffer memory for storing the received packets, the method having the following steps, after direction of a loss of packets:
  request for retransmission of the lost packets;
  reception of retransmitted packets and realtime packets, the retransmitted packets having been transmitted with priority in relation to the realtime packets; and
  storage of the retransmitted packets in the buffer memory.

The invention also relates to a transmitter suited to transmitting a realtime data stream at a given speed in the form of packets to a receiver in a telecommunication network, characterized in that it has:
  means for receiving a request for retransmission of lost packets; and
  means for transmitting retransmitted packets and realtime packets, the retransmitted packets being transmitted with priority in relation to the realtime packets.

According to one particular embodiment, the means for transmitting retransmitted packets and realtime packets are configured to transmit the retransmitted packets during a time interval during which the realtime packets are transmitted at a transmission speed that is lower than the given speed. Advantageously, the retransmitted packets are transmitted at a retransmission speed that is equal to the difference between a speed that is higher than the given speed and the transmission speed for the realtime packets during said time interval.

According to another particular embodiment, the means for transmitting retransmitted packets and realtime packets are configured to transmit the retransmitted packets during a time interval during which no realtime packet is transmitted. Advantageously, the retransmitted packets are transmitted at a retransmission speed that is higher than the given speed.

The invention likewise relates to a receiver suited to receiving a realtime data stream transmitted at a given speed in the form of packets from a transmitter in a telecommunication network, the receiver having a buffer memory for storing the received packets and means for detecting a loss of packets, characterized in that it has:

means for requesting retransmission of the lost packets;
means for receiving retransmitted packets and realtime packets, the retransmitted packets having been transmitted with priority in relation to the realtime packets; and
means for storing the retransmitted packets in the buffer memory.

These devices have advantages similar to those of the methods presented above.

In one particular embodiment, the various steps of the methods according to the invention are determined by computer program instructions. Consequently, the invention is also aimed at a computer program on an information storage medium, said program being capable of being implemented in the processor of a transmitter or receiver above, said program having instructions suited to the implementation of the steps of a method as described above. This program can use any programming language, and may be in the form of source code, object code, or intermediate code between source code and object code, such as in a partially compiled form, or in any other desirable form.

The invention is also aimed at an information storage medium that can be read by a computer, and having computer program instructions as mentioned above. The information storage medium may be any entity or device that is capable of storing the program. By way of example, the medium may have a storage means, such as a ROM, for example a CD-ROM or a microelectronic circuit ROM, or else a magnetic recording means, for example a floppy disk or a hard disk. Moreover, the information storage medium may be a transmissible medium such as an electrical or optical signal, which can be routed via an electrical or optical cable, by radio or by other means. The program according to the invention may be downloaded on a network of Internet type, for example. Alternatively, the information storage medium may be an integrated circuit that incorporates the program, the circuit being suited to executing or to being used in the execution of the method in question.

BRIEF DESCRIPTION OF THE DRAWINGS

Other features and advantages will appear upon reading preferred embodiments that are described with reference to the figures, in which, apart from FIG. 1 that has already been mentioned with regard to the prior art:

FIG. 2 schematically shows the equipment involved in the present invention;

FIG. 3 shows a flowchart for the method according to the invention;

DETAILED DESCRIPTION OF ILLUSTRATIVE EMBODIMENTS

Figure 1:
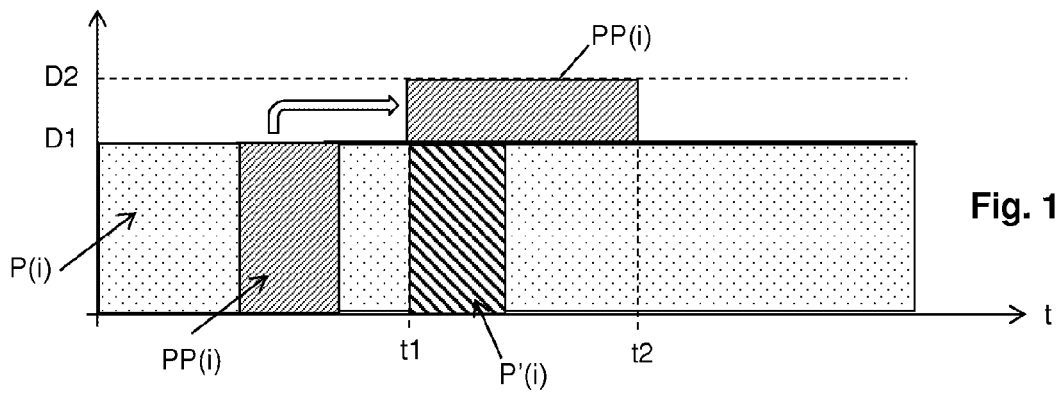

According to an embodiment of the invention that is shown in FIG. 2, a transmitter 1 transmits data to a receiver 2, at a given speed (i.e., predetermined transmission rate) D1. By way of example, the transmitter 1 is a server that broadcasts a data stream in real time, for example a delinearized video service called VoD (Video on Demand).

The IT communication protocol called Real-Time Transport Protocol (RTP) is used. This protocol is itself based on the UDP (User Datagram Protocol) protocol. The data are transmitted in the form of packets.

The RTP protocol adds a specific header to the packets in order to provide information about the type of media transported, the sequencing and the synchronization of the datagrams, so that the receiver is able to detect the datagrams that are lost on the network or incorrectly received, and is possibly able to reconstruct a continuous stream.

The transmitter 1 has the conventional structure of a computer. It has a processor 11, a random access memory 12 and a read only memory 13. It has data transmission/reception means 14. It likewise has a retransmission memory 15, in which it stores the transmitted data and that allows retransmission of the lost data at reception.

According to the invention, the transmission/reception means of the transmitter 1 are suited to receiving a request for retransmission of packets that is transmitted by the receiver 2. The transmitter then implements transmission of retransmitted packets and realtime packets, the retransmitted packets being transmitted with priority in relation to the realtime packets.

The receiver 2 itself also has the conventional structure of a computer. It has a processor 21, a random access memory 22 and a read only memory 23. It likewise has data transmission/reception means 24. It likewise has a buffer memory 25 in which it stores the data that it receives from the transmitter 1. The receiver 2 has standard means for decoding streams in real time 26, such as a video stream.

According to the invention, the transmission/reception means of the receiver 2 are suited to transmitting a request for retransmission of the lost packets to the transmitter 2. In one embodiment, this retransmission request may contain a request for retransmission at a given retransmission speed, for example a speed (i.e., transmission rate) that is higher than the given speed D1 for transmission in real time.

The transmission/reception means of the receiver 2 are likewise suited to receiving retransmitted packets and realtime packets, the retransmitted packets having been transmitted with priority in relation to the realtime packets, and to transmitting the retransmitted packets to the buffer memory that stores them.

The specific operation of these pieces of equipment within the framework of the invention will now be described. As shown in FIG. 3, the following steps are implemented in order to correct data packet losses in accordance with an improved mechanism.

In a step E1, the transmitter 1 transmits data packets P(i) constituting what is known as a real time stream, at a given speed. By way of example, a video is involved. The transmitter 1 stores the transmitted data in the memory 15.

In a step E2, the receiver 2 receives the data transmitted by the transmitter 1. The receiver analyzes the received packets and notably detects any packet losses. The receiver 2 decodes the received data in order to display the video.

Let us suppose that the receiver 2 detects a packet loss. In a step E3, the receiver 2 then sends a request for retransmission to the transmitter 1, in the form of a request of RTCP (Real-Time Transport Control Protocol) type.

Figure 5A:
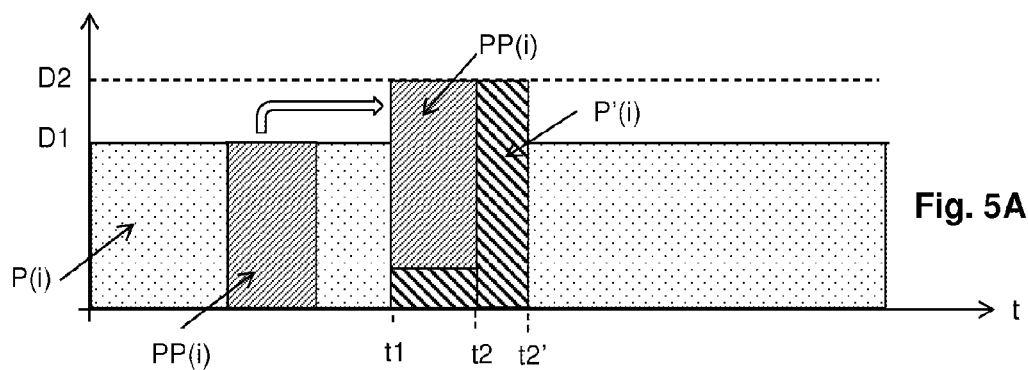
FIGS. 5A and 5B illustrate the transmission of the packets in real time and of the retransmitted packets according to another embodiment of the present invention.
Figure 5B:
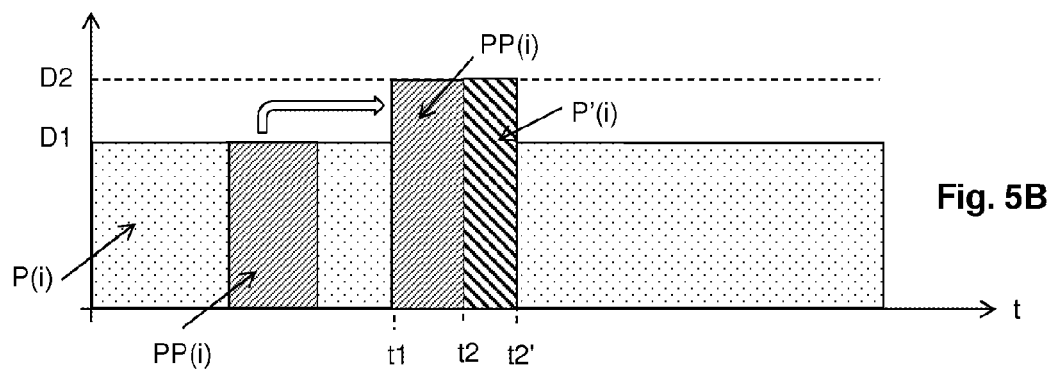

In an advantageous embodiment that is illustrated further on in relation to FIGS. 5A and 5B, the receiver 2 is able to implement speed management at this stage, which involves asking the transmitter 1 to retransmit the lost packets PP(i) at a retransmission speed that is higher than the transmission speed for the realtime packets. By way of example, the speed management is realized using the "speed" attribute of the RTCP protocol. Of course, the speed management is effected within a limit that observes the realtime constraints for the provision of the data packets for video decoding so as to display the video fluidly.

During this step E3, the transmitter 1 receives the request for retransmission of lost packets. It then retrieves the lost data from its memory 15 and retransmits the lost packets PP(i), during a step E4, at the retransmission speed requested by the receiver 2 if the latter implements speed management, or at a retransmission speed that is configured on the transmitter 1.

Simultaneously, during this step E4, the transmitter is able to continue to transmit packets P'(i) at the rate of the realtime stream. The lost packets PP(i) are retransmitted with a higher priority than the realtime packets, however. For this, the transmitter 1 uses a mechanism for organizing data to be transmitted, so as to favor the retransmitted packets PP(i) over the packets P'(i) transmitted in real time.

Figure 4A:
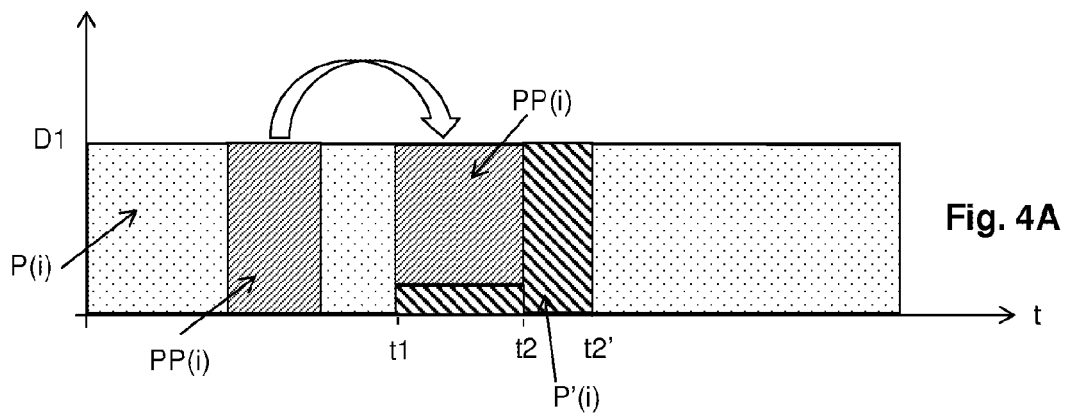
FIGS. 4A and 4B illustrate the transmission of the packets in real time and of the retransmitted packets according to an embodiment of the present invention.

In a first embodiment, which is illustrated in FIG. 4A, this process of prioritizing the lost packets PP(i) over the realtime packets P'(i) amounts to transmitting, during a time interval [t1;t2] during which the lost packets PP(i) are retransmitted by the transmitter 1, the realtime packets at a speed D1' that is lower than the given speed D1, that is to say by reducing the speed of the stream in real time, for example to a reduced speed that is equal to 10% of the speed D1. FIG. 4A illustrates the realtime packets P'(i) for which transmission is staggered in time, up to an instant t'2, using such a mechanism.

Figure 4B:
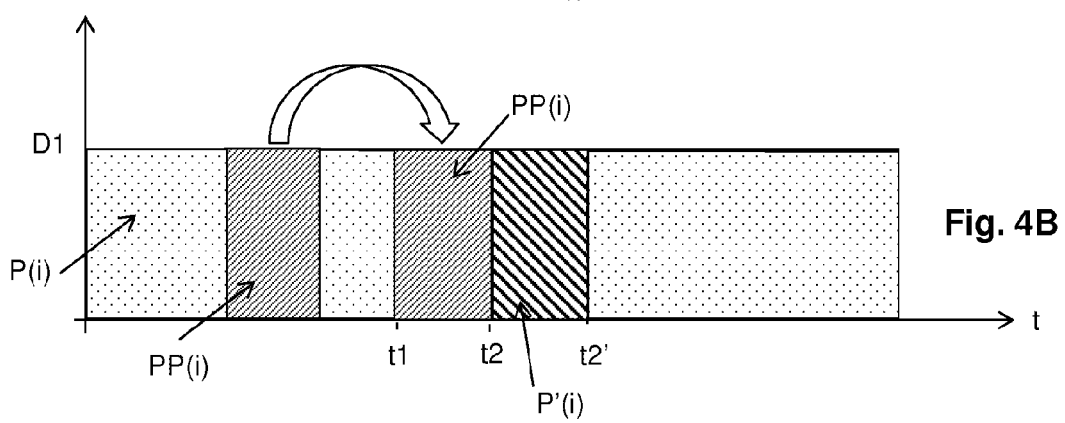

In one variant of this first embodiment, which is illustrated in FIG. 4B, this process of prioritizing the lost packets over the realtime packets is a "strict" prioritization process, which amounts to interrupting the transmission of the realtime packets P'(i), during the time interval [t1;t2] during which only the retransmitted packets PP(i) are transmitted by the transmitter 1.

In relation to the prior art illustrated by FIG. 1, this allows more rapid retransmission of the retransmitted packets and therefore the possibility of correcting errors when the buffer memory size is sufficient (for example with a buffer memory size of 30 s for a video of 1 h30).

In another advantageous embodiment in which an overhead D2 is used, which is illustrated in FIG. 5A, besides the fact that the realtime packets P'(i) are transmitted at a speed D1' that is lower than the given speed D1 during a time interval [t1;t2] during which the lost packets PP(i) are retransmitted by the transmitter 1, the retransmitted packets PP(i) can be transmitted at a retransmission speed that corresponds to the difference between a speed D2, which is higher than the given speed D1, and the speed D1' that is used for the realtime stream during the time interval [t1;t2].

In one variant of this other embodiment, which is illustrated in FIG. 5B, the transmission of the realtime packets is interrupted during the time interval [t1;t2] during which only the retransmitted packets PP(i) are transmitted by the transmitter 1 and the retransmitted packets PP(i) are transmitted at a retransmission speed D2 that is higher than the given speed D1, which allows the lost packets PP(i) to be retransmitted even more rapidly.

During this retransmission phase, the realtime packets P'(i), which have lower priority than the retransmitted lost packets PP(i), are stored by the transmitter 1. When the lost packets have been retransmitted, all of the realtime packets that have been stored are then transmitted, at the speed D2 that is higher than the nominal speed D1 for the realtime stream, in order to allow the stream to catch up with real time and to return to the speed D1 more rapidly.

In relation to the prior art illustrated by FIG. 1, this allows the retransmitted packets to be retransmitted even more rapidly and therefore the possibility of correcting more packet losses for an equal size of buffer memory, or of correcting the same number of packet losses with a smaller size of buffer memory and therefore of allowing the size of the buffer memory to be reduced.

In a step E5, the receiver 2 receives the lost and retransmitted packets and the realtime packets. Since the lost and retransmitted packets have been transmitted with priority in relation to the realtime packets, and advantageously at a speed that is higher than the speed of these realtime packets, this allows the video decoding to be fed immediately while filling the buffer memory 25.

When the buffer memory 25 reaches a sufficient fill level, so in a step E6, the receiver 2 sends a request to the transmitter 1 to ask it to transmit only the realtime packets, at the given speed. In other words, the transmitter 1 returns to step E1.

The invention thus allows the filling of the buffer memory 25 to be speeded up. The data loss correction capabilities are thus increased, without modification of the elements involved in the transmission chain, such as size of the buffer memory 25 or transmission speed.

Although the present disclosure has been described with reference to one or more examples, workers skilled in the art will recognize that changes may be made in form and detail without departing from the scope of the disclosure and/or the appended claims.

The invention claimed is:

1. A transmission method comprising:
transmitting a realtime data stream transmitted using an RTP protocol at a predetermined transmission rate, in the form of packets transmitted between a transmitter and a receiver in a telecommunication network,
wherein transmitting has the following steps:
receiving, at the transmitter, a request for retransmission of lost packets; and
transmitting, from the transmitter, retransmitted packets and realtime packets using the RTP protocol, the retransmitted packets being transmitted with priority in relation to the realtime packets during a time interval during which the real time packets are transmitted at a transmission rate that is lower than the predetermined transmission rate.

2. The transmission method as claimed in claim 1, wherein the retransmitted packets are transmitted at a retransmission transmission rate that is equal to the difference between a transmission rate that is higher than the predetermined transmission rate and the transmission rate of the realtime packets during said time interval.

3. The transmission method as claimed in claim 1, wherein the retransmitted packets that are transmitted with priority in relation to the realtime packets are transmitted during a time interval during which no realtime packet is transmitted.

4. The transmission method as claimed in claim 1, wherein the retransmitted packets are transmitted at a retransmission transmission rate that is higher than the predetermined transmission rate.

5. A method comprising:
   receiving a realtime data stream transmitted using an RTP protocol at a predetermined transmission rate in the form of packets between a transmitter and a receiver in a telecommunication network, the receiver having a buffer memory for storing the received packets,
   wherein receiving has the following steps, after detection of a loss of packets:
   requesting, at the receiver, the retransmission of the lost packets;
   receiving, at the receiver, retransmitted packets and realtime packets, the retransmitted packets having been transmitted using the RTP protocol with priority in relation to the realtime packets during a time interval during which the real time packets are transmitted at a transmission rate that is lower than the predetermined transmission rate; and
   storing the retransmitted packets in the buffer memory.

6. A transmitter suited to transmitting a realtime data stream using an RTP protocol at a predetermined transmission rate in the form of packets to a receiver in a telecommunication network, wherein the transmitter comprises:
   means for receiving a request for retransmission of lost packets; and
   means for transmitting retransmitted packets and realtime packets using the RTP protocol, the retransmitted packets being transmitted with priority in relation to the realtime packets during a time interval during which the real time packets are transmitted at a transmission rate that is lower than the predetermined transmission rate.

7. The transmitter as claimed in claim 6, wherein the means for transmitting retransmitted packets and realtime packets are configured to transmit the retransmitted packets during a time interval during which the realtime packets are transmitted at a transmission rate that is lower than the predetermined transmission rate.

8. The transmitter as claimed in claim 7, wherein the retransmitted packets are transmitted at a retransmission transmission rate that is equal to the difference between a transmission rate that is higher than the predetermined transmission rate and the transmission rate for the realtime packets during said time interval.

9. The transmitter as claimed in claim 6, wherein the means for transmitting retransmitted packets and realtime packets are configured to transmit the retransmitted packets during a time interval during which no realtime packet is transmitted.

10. The transmitter as claimed in claim 9, wherein the retransmitted packets are transmitted at a retransmission transmission rate that is higher than the predetermined transmission rate.

11. A receiver suited to receiving a realtime data stream transmitted using an RTP protocol at a predetermined rate in the form of packets from a transmitter in a telecommunication network, the receiver comprising:
    a buffer memory for storing the received packets;
    means for detecting a loss of packets;
    means for requesting retransmission of the lost packets;
    means for receiving retransmitted packets and realtime packets using the RTP protocol, the retransmitted packets having been transmitted with priority in relation to the realtime packets during a time interval during which the real time packets are transmitted at a transmission rate that is lower than the predetermined transmission rate; and
    means for storing the retransmitted packets in the buffer memory.

* * * * *